(12) United States Patent
Gretz (10) Patent No.: US 10,811,863 B1
(45) Date of Patent: *Oct. 20, 2020

(54) LIQUID-TIGHT AND CONCRETE-TIGHT FITTING FOR PVC-JACKETED METAL-CLAD ELECTRICAL CABLE

(71) Applicant: Arlington Industries, Inc., Scranton, PA (US)

(72) Inventor: Thomas J. Gretz, Delray Beach, FL (US)

(73) Assignee: ARLINGTON INDUSTRIES, INC., Scranton, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/510,351

(22) Filed: Jul. 12, 2019

Related U.S. Application Data (60) Provisional application No. 62/699,873, filed on Jul. 18, 2018.

(51) Int. Cl.
| | | |
|---|---|---|
| *H02G 3/06* | (2006.01) | |
| *H02G 3/08* | (2006.01) | |
| *H02G 3/22* | (2006.01) | |
| *H02G 15/00* | (2006.01) | |
| *H02G 15/013* | (2006.01) | |
| *H02G 15/04* | (2006.01) | |
| *H01R 13/52* | (2006.01) | |

(52) U.S. Cl.
CPC ......... *H02G 15/04* (2013.01); *H01R 13/5221* (2013.01)

(58) Field of Classification Search
CPC .... H01R 13/5221; H02G 3/0658; H02G 3/06; H02G 3/08; H02G 3/22; H02G 15/04; H02G 15/013; H02G 15/00

USPC ................. 174/655, 650, 652, 660
See application file for complete search history.

(56) References Cited

U.S. PATENT DOCUMENTS

| | | |
|---|---|---|
| 4,549,755 A | 10/1985 | Kot et al. |
| 5,059,747 A | 10/1991 | Bawa |
| 5,204,499 A | 4/1993 | Favalora |
| 5,593,186 A | 1/1997 | Harris |
| 5,866,853 A | 2/1999 | Sheehan |
| 6,034,325 A | 3/2000 | Nattel et al. |
| 6,273,477 B1 | 8/2001 | Ohmi |
| 6,450,550 B1 | 9/2002 | Cornwell |
| 6,538,201 B1 | 3/2003 | Gretz |
| 6,767,032 B1 | 7/2004 | Gretz |
| 7,080,859 B1 | 7/2006 | Gretz |

(Continued)

*Primary Examiner* — Timothy J Thompson
*Assistant Examiner* — Guillermo J Egoavil (57) ABSTRACT

An electrical fitting for securing PVC jacketed metal clad (PVC-MC) or Teck 90 electrical cable to an electrical box or panel in a liquid-tight and concrete-tight fit. The electrical fitting includes a tubular fitting body having a threaded inbound and outbound end, a gripper ring, one or more grommets, a bushing, a sealing ring, a locknut, and a gland nut. The grommet includes an outbound end with a tubular wall portion and an inbound end with a flange and an inner lip. The gripper ring includes a tubular base, one or more fingers extending from the base, and arcuate ends on the fingers. The fingers include a curvature which matches the curvature of the base. The fitting will accommodate a range of cable sizes and while providing a liquid-tight and concrete-tight connection and proper electrical grounding of the cables to an electrical box or panel.

1 Claim, 15 Drawing Sheets

(56) References Cited

U.S. PATENT DOCUMENTS

| | | | |
|---|---|---|---|
| 9,385,520 B1 | 7/2016 | Gretz | |
| 9,496,694 B1 * | 11/2016 | Gretz | ..................... H02G 3/085 |
| 9,647,439 B1 * | 5/2017 | Gretz | ................... H02G 3/0658 |
| 9,831,649 B1 | 11/2017 | Gretz | |
| 2008/0253730 A1 * | 10/2008 | Cox | ..................... G02B 6/4444 |
| | | | 385/138 |

* cited by examiner

LIQUID-TIGHT AND CONCRETE-TIGHT FITTING FOR PVC-JACKETED METAL-CLAD ELECTRICAL CABLE

This application claims priority to provisional U.S. Application No. 62/699,873, filed Jul. 18, 2018.

FIELD OF THE INVENTION

This invention relates to electrical fittings or connectors for connecting electrical cables to a panel and specifically to a liquid-tight and concrete-tight fitting for connecting PVC jacketed MC cable or Teck 90 cable to an electrical box or panel.

BACKGROUND OF THE INVENTION

PVC jacketed metal-clad (PVC-MC) and Teck 90 electrical cable are both suitable for use in hazardous environments including damp, dry, or wet locations, in direct burial applications or embedded in concrete. PVC-MC and Teck 90 cables typically include a plurality of internal conductors within an interlocked conductive armor layer covered by an outer jacket of PVC (polyvinyl chloride). The armor in many cases may serve as the grounding path for the cable.

Although various liquid-tight electrical fittings have been disclosed for connecting electrical cable to an electrical box, the functionality of the fittings are limited as they could only be used with a single size of electrical cable. Accordingly, as there are many nominal sizes of electrical cable, it would beneficial to provide an electrical fitting that can accommodate more than one nominal size of electrical cable.

BRIEF SUMMARY OF THE INVENTION

The current invention is a liquid-tight and concrete-tight electrical fitting for securing PVC jacketed MC cable or Teck 90 cable to an electrical box or panel. The electrical fitting includes a tubular fitting body having a threaded inbound and outbound end, a gripper ring, one or more grommets, a bushing, a sealing ring, a locknut, and a gland nut. Each grommet includes an inbound end with a flange and an inner lip, and an outbound end with a wall. The bushing engages the flange of the grommet. The gripper ring includes a base, an inbound end, an outbound end, and one or more fingers extending from the base. Arcuate ends are provided on the fingers of the gripper ring arms. The curvature on the arcuate ends of the fingers matches the curvature of the base. The fitting facilitates liquid-tight and concrete-tight connection and proper electrical grounding of PVC-MC and Teck 90 cables in a range of sizes to an electrical box or panel. In a preferred embodiment, one of the plurality of grommets provided with the electrical fitting assembly may be selected to match the cable sizes used at the job site.

OBJECTS AND ADVANTAGES

A first object of the current invention is to provide an electrical fitting that enables liquid-tight and concrete-tight connection of PVC jacketed MC cable or Teck 90 cable to an electrical box or panel.

A second object of the invention is to provide an electrical fitting that creates secure grounding of PVC-MC electrical cable to the fitting and to an electrical box or panel.

A further object of the invention is to provide a liquid-tight and concrete-tight electrical fitting that can accommodate a range of cable sizes in order to reduce inventory and save the cost of stocking several different fittings.

BRIEF DESCRIPTION OF THE SEVERAL VIEWS OF THE DRAWING(S)

Reference is made herein to the accompanying drawings, which are not necessarily drawn to scale, and wherein.

DETAILED DESCRIPTION

Figure 1:
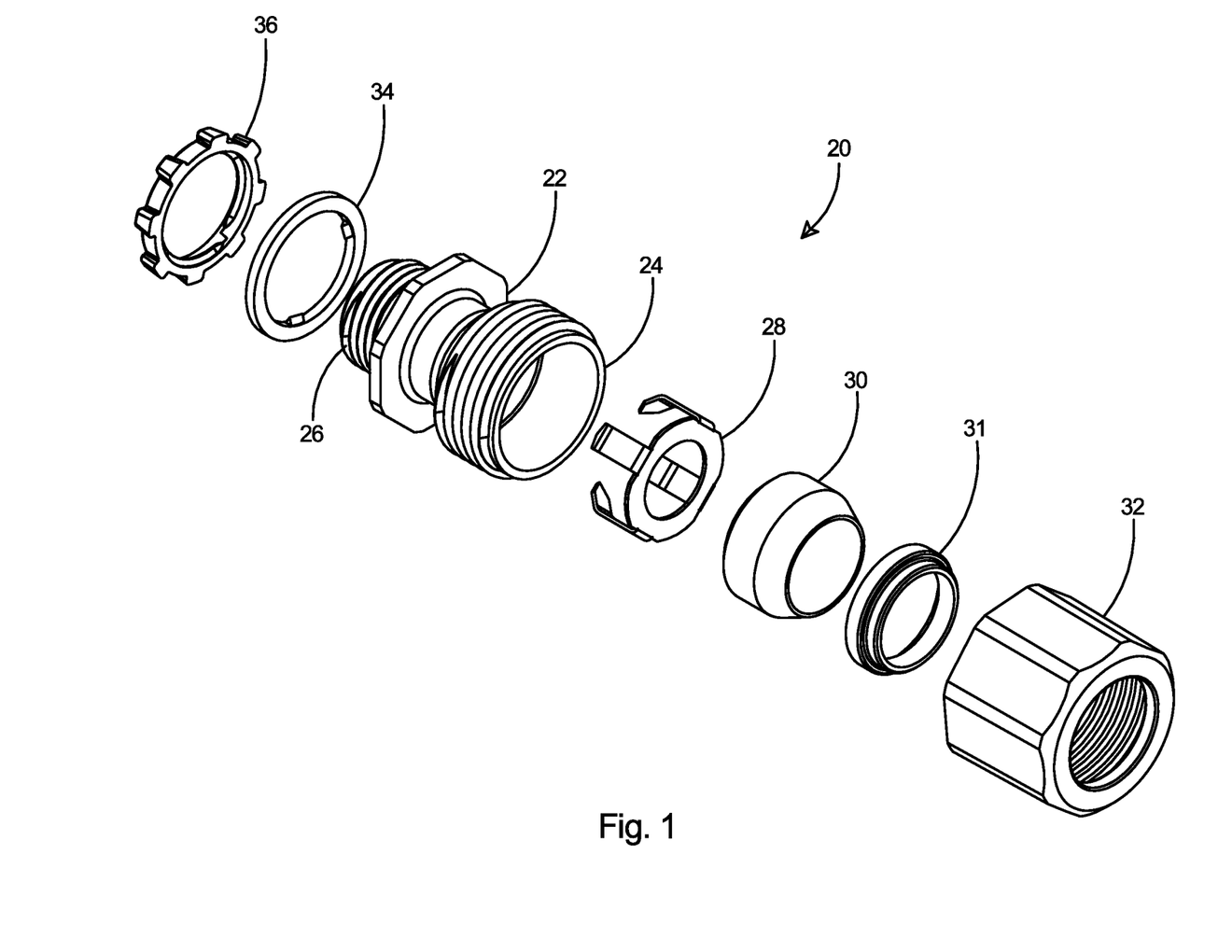
FIG. 1 is an exploded isometric view of a fitting for PVC-jacketed MC cable in accordance with embodiments of the invention.

With reference to FIG. 1, the present invention is an electrical fitting for PVC jacketed Metal Clad (PVC-MC)

electrical cable. The electrical fitting 20 includes a fitting body 22 having an inbound end 24 and an outbound end 26. The fitting includes a gripper ring 28, a grommet 30, and a bushing 31, secured to the inbound end 24 by a gland nut 32. The outbound end 26 of the fitting includes a sealing ring 34 that will be secured to the by a locknut 36 after the outbound end is connected to an electrical panel or electrical box (not shown).

Figures 2, 3:
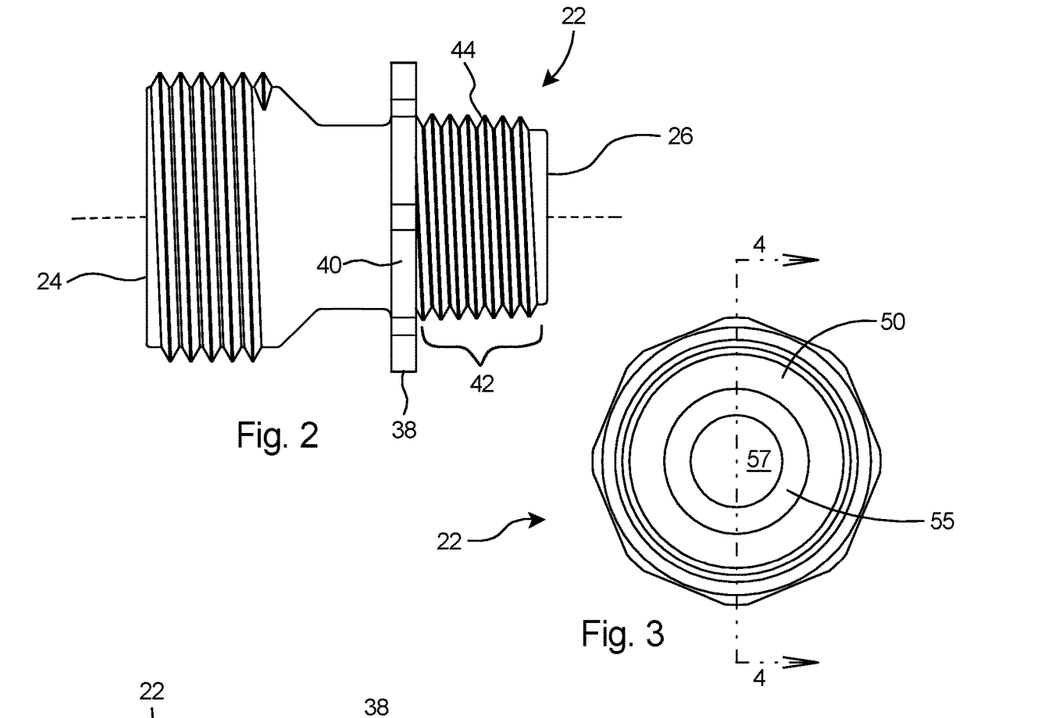
FIG. 2 is a side view of a body which forms a portion of the fitting of FIG. 1.
FIG. 3 is an end view of the body as taken from the left side of FIG. 6.
Figure 4:
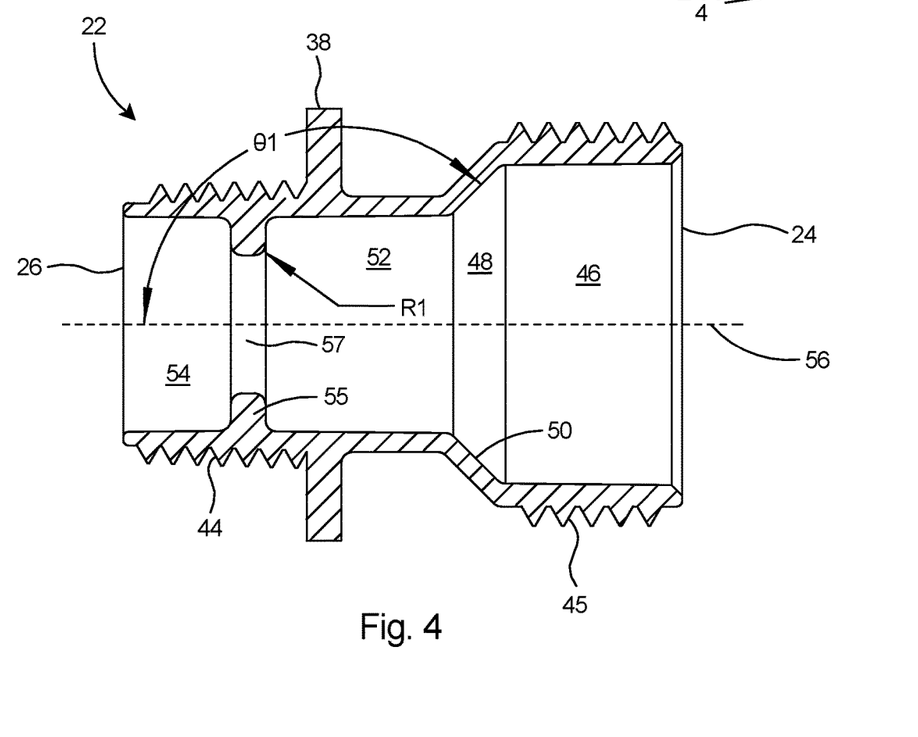
FIG. 4 is a sectional view of the body taken along line 4-4 of FIG. 3.

Referring to FIGS. 2-4, the fitting body 22 includes a central flange 38 with flat surfaces or facets 40 thereon enabling gripping by a wrench or similar tool, a threaded nose portion 42 extending from the outbound end 26, a threaded tubular portion 44 at the outbound end 26, and a threaded tubular portion 45 at the inbound end 24.

As shown in FIG. 4, the fitting body 22 includes an inbound channel 46 at the inbound end 24, a necked-down channel 48 formed by a ramped surface 50 circumscribing the interior of the body, a central channel 52, and an outbound channel 54 at the outbound end 26. A cable stop 55 extends from the interior of the body 22 and divides the body into the central channel 52, and the outbound channel 54. Cable stop 55 will function to stop advancement of a PVC-MC cable that is inserted into the inbound end 24 of the fitting body. Stop wall 55 is rounded (see radius R1) and the ramped surface 50 is at angle θ1 with respect to the central axis 56 of the body 22. Angle θ1 is preferably between 130 and 140 degrees and radius R1 is preferably between 0.05 and 0.07 inch. The narrow opening 57 defined by the cable stop 55 enables conductors (not shown) to pass through the fitting.

Figure 7:
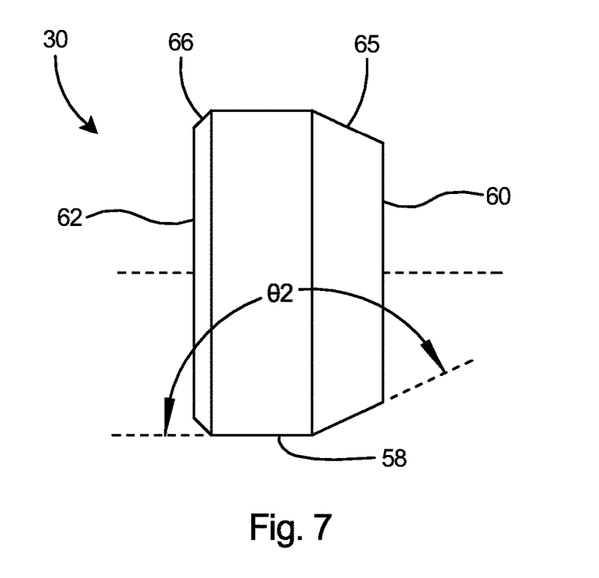
FIG. 7 is a side view of a grommet which forms a portion of the fitting of FIG. 1.
Figure 8:
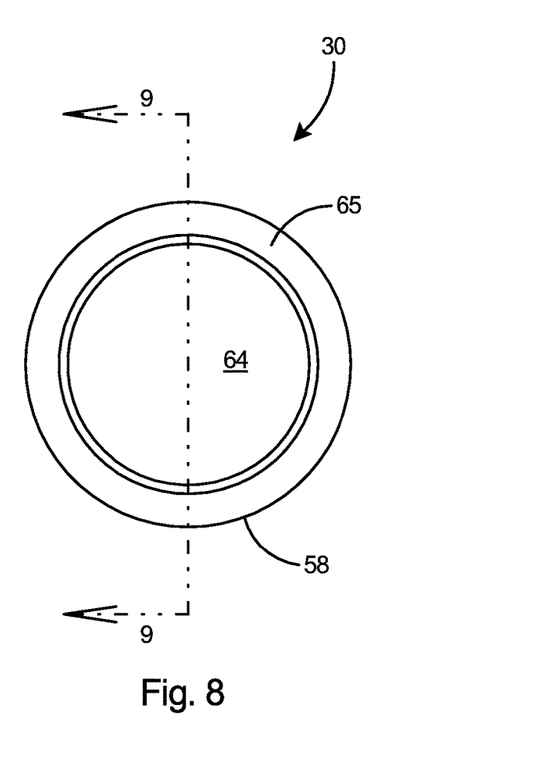
FIG. 8 is an end view of the grommet.
Figure 9:
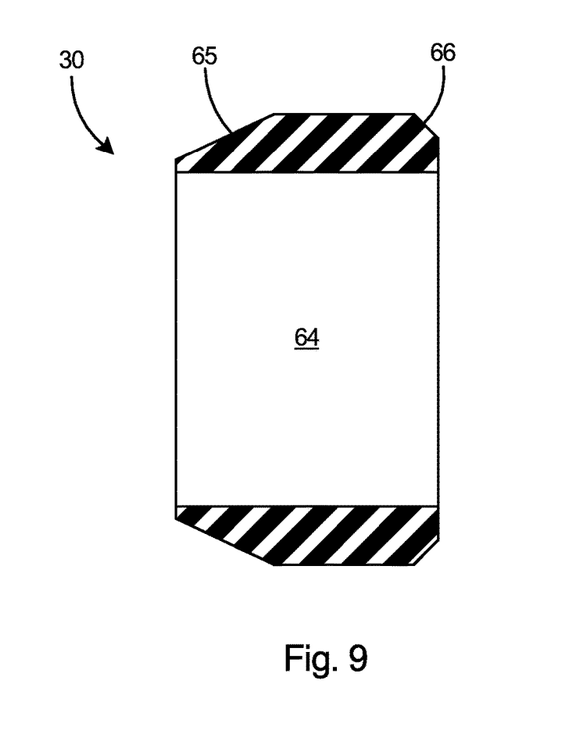
FIG. 9 is a sectional view of the grommet taken along line 9-9 of FIG. 8.

With reference to FIGS. 7-9, the grommet 30 is substantially cylindrical shaped and includes a body 58 having an inbound end 60, an outbound end 62, and a bore 64 there through. The bore 64 of the grommet 30 is of constant inner diameter and the grommet includes a necked-down inbound nose 65 and a chamfered outbound nose 66. The grommet is preferably constructed of elastomeric material. The grommet 30 is preferably molded in one piece of SANTO-PRENE®, a synthetic rubber elastomeric material available from Monsanto Company Corporation of St. Louis, Mo. Most preferably, in order to accommodate a range of cable sizes, more than one grommet is provided with each electrical fitting.

Figure 5:
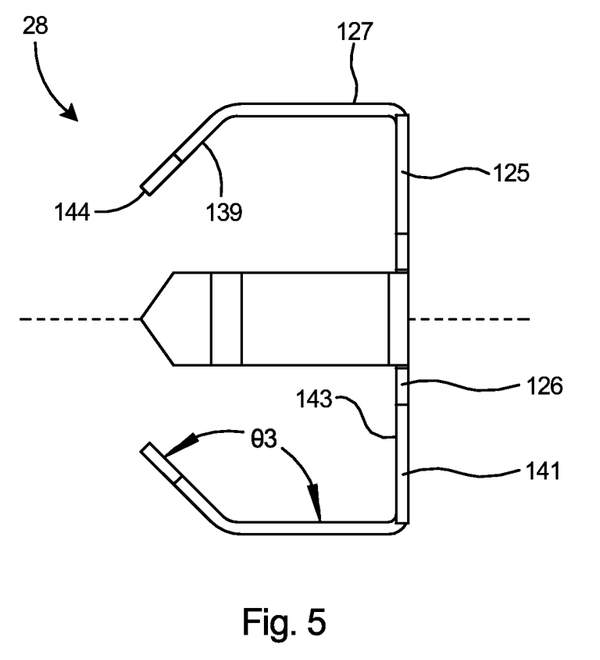
FIG. 5 is a side view of a gripper ring which forms a portion of the fitting of FIG. 1.
Figure 6:
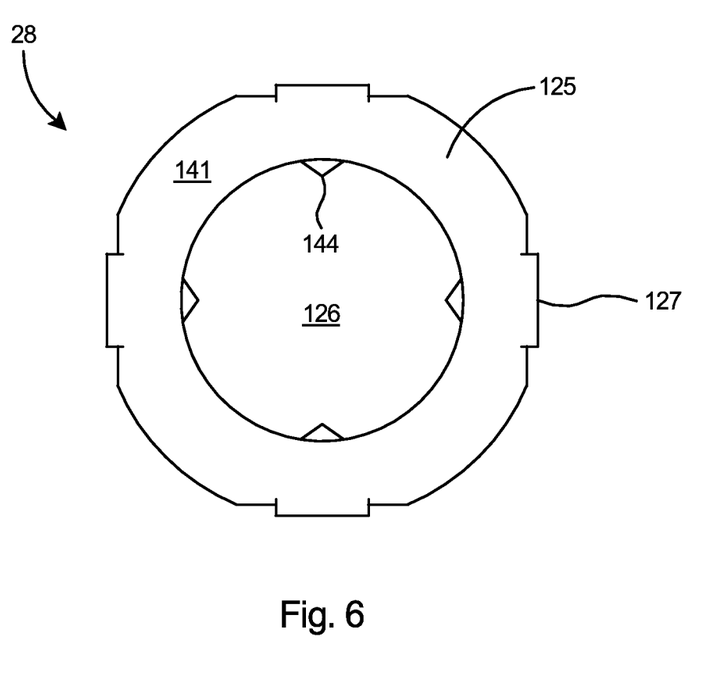
FIG. 6 is an end view of the gripper ring.
Figures 18, 19:
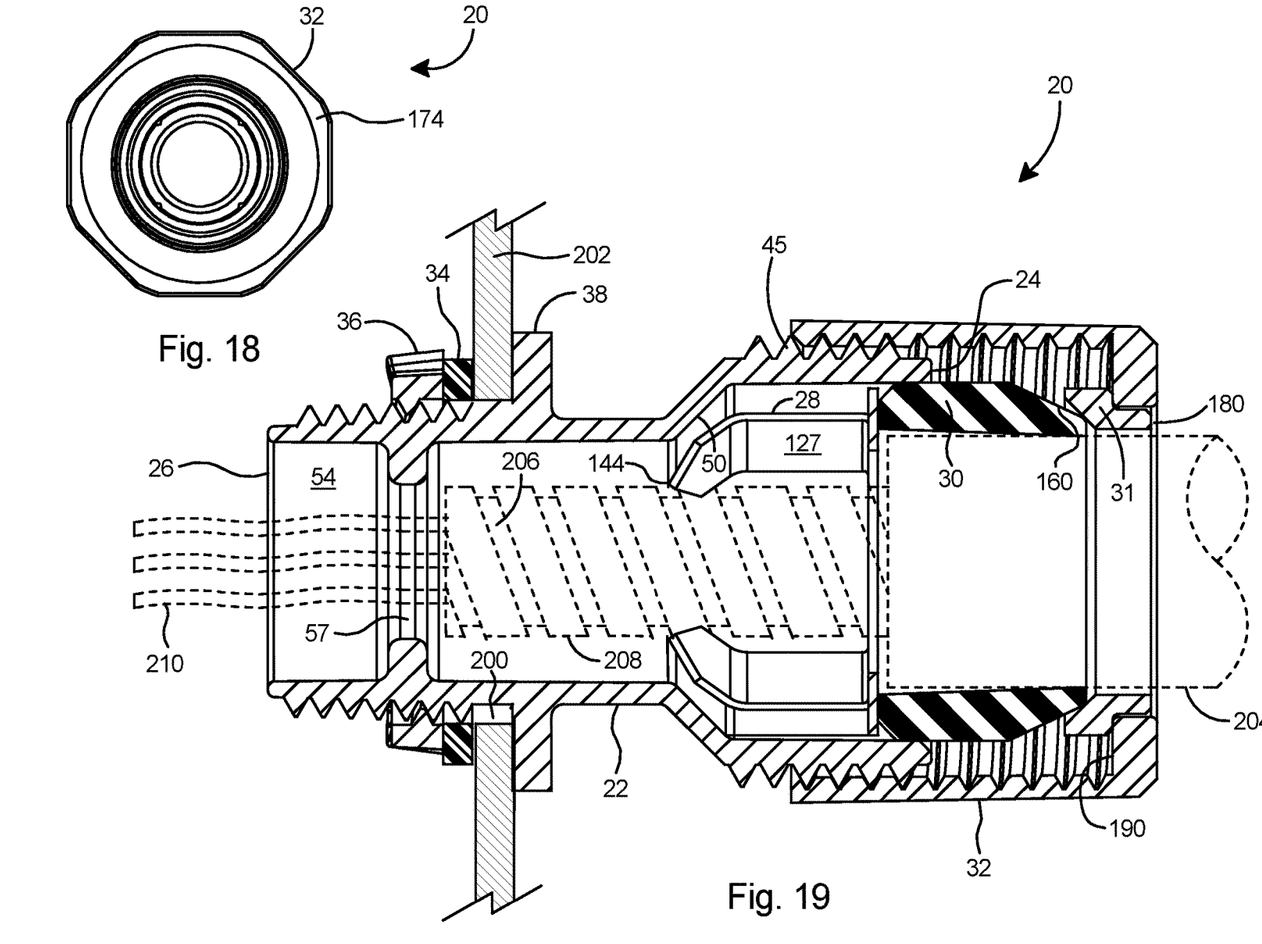
FIG. 18 is an end view of the fitting as viewed from the right side of FIG. 16.
FIG. 19 is a sectional view of the fitting taken along line 19-19 of FIG. 16.
Figure 20:
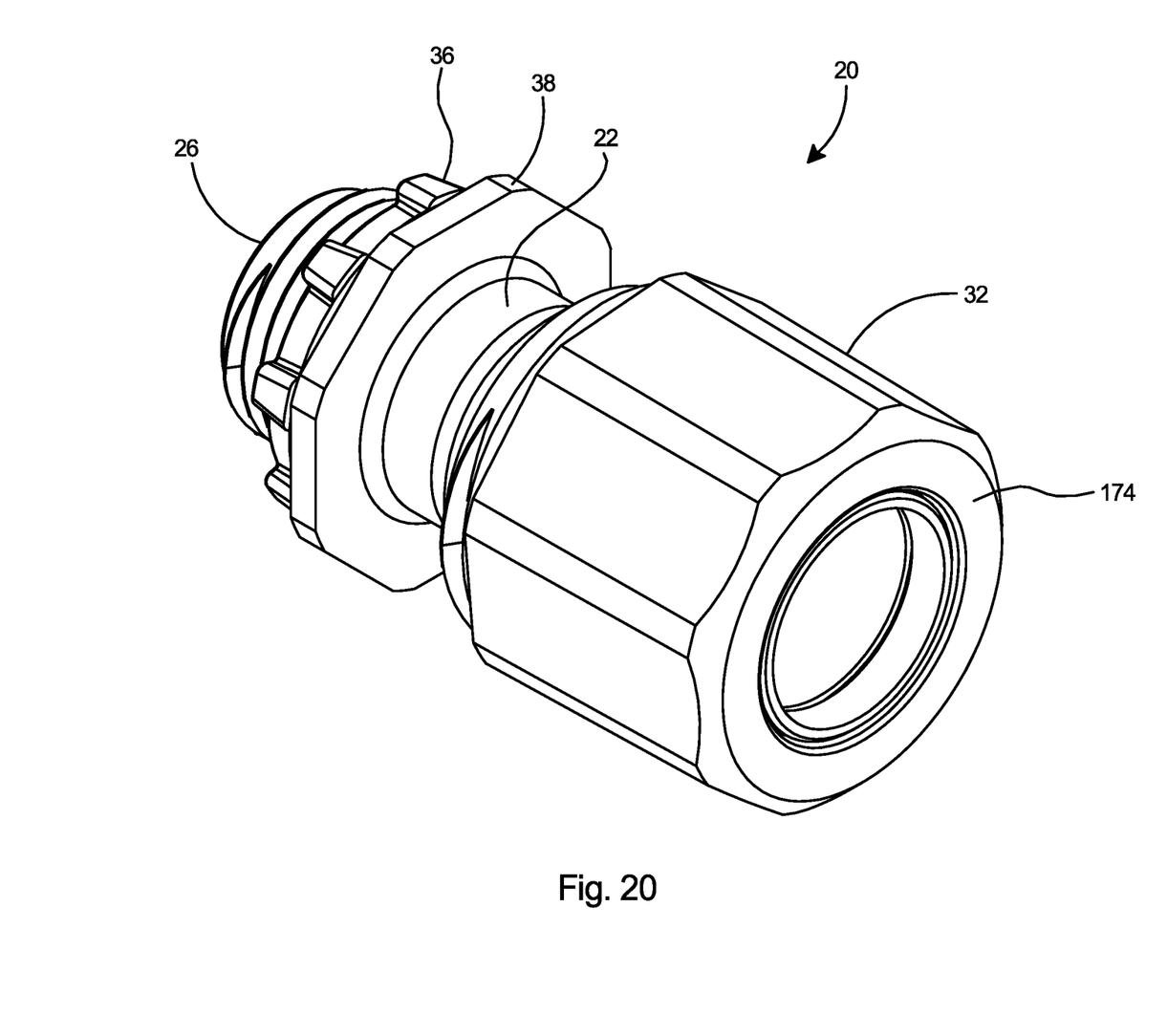
FIG. 20 is an isometric view of the assembled electrical fitting.

Referring to FIGS. 5-6, the gripper ring 28 includes a base 125 with an opening 126 and a plurality of fingers 127 extending at right angles from the outer periphery of the base 125 as shown in FIG. 19. The fingers 127 include end portions 139 bent inwards or toward the central opening at an angle of θ3 with respect to the fingers 127. The base 125 includes an inbound end 141 and an outbound end 143, with the fingers 127 extending from the outbound end 143. The end of each finger includes a sharpened point 144. Preferably there are four fingers 127 extending from the base 125. The angle θ3 of the end portions 139 with respect to the fingers 127 is preferably between 130 and 140 degrees.

Figure 10:
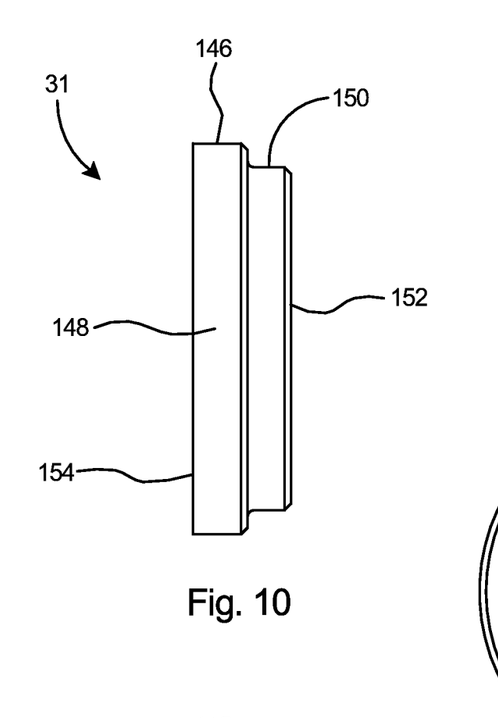
FIG. 10 is a side view of a bushing which forms a portion of the fitting of FIG. 1.
Figure 11:
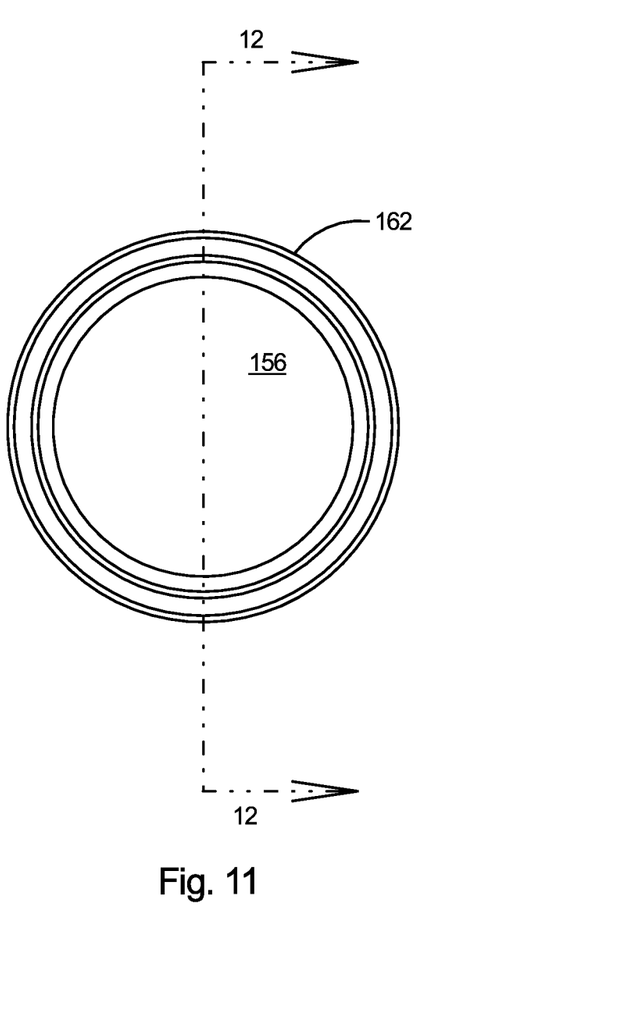
FIG. 11 is an end view of the bushing.
Figure 12:
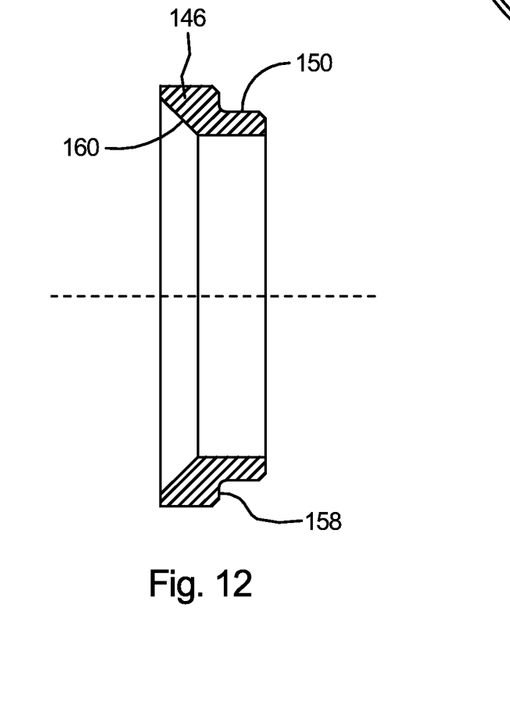
FIG. 12 is a sectional view of the bushing taken along line 12-12 of FIG. 11.

Referring to FIGS. 10-12, the tubular bushing 31 includes a body 146 having a base 148 and a collar 150 extending from the base. The bushing 31 includes an inbound end 152, an outbound end 154, an abutment surface 158 on the inbound end 152 of the base 148, and an engagement surface 160 on the inner periphery of the body 146. Bushing is preferably constructed of metal and is most preferably constructed of zinc.

Figure 13:
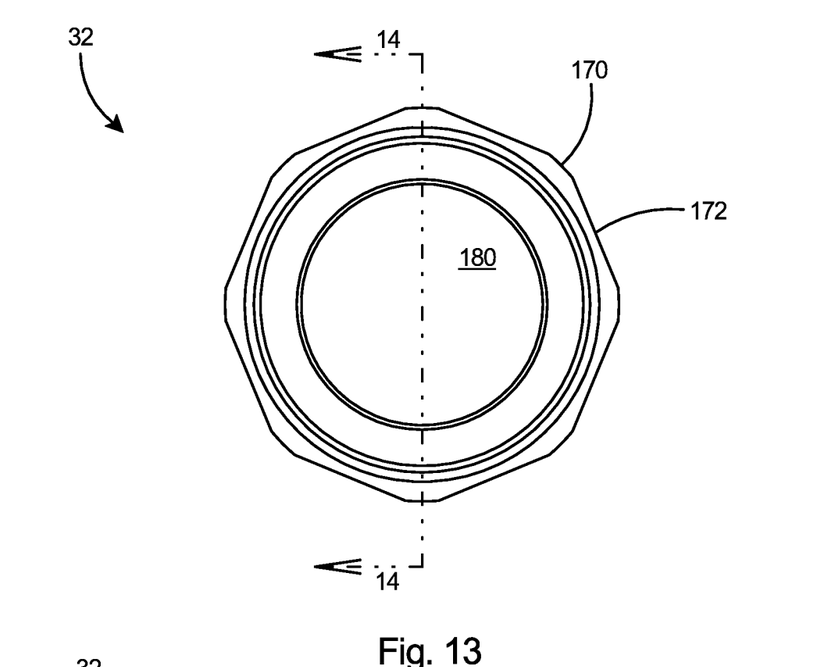
FIG. 13 is an end view of a nut which forms a portion of the fitting of FIG. 1.
Figure 14:
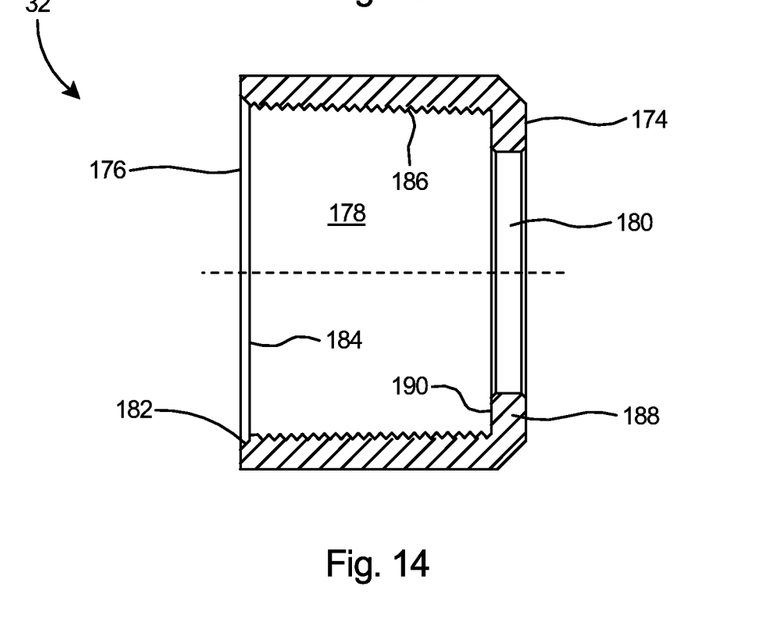
FIG. 14 is a sectional view of the nut taken along line 14-14 of FIG. 13.
Figure 15:
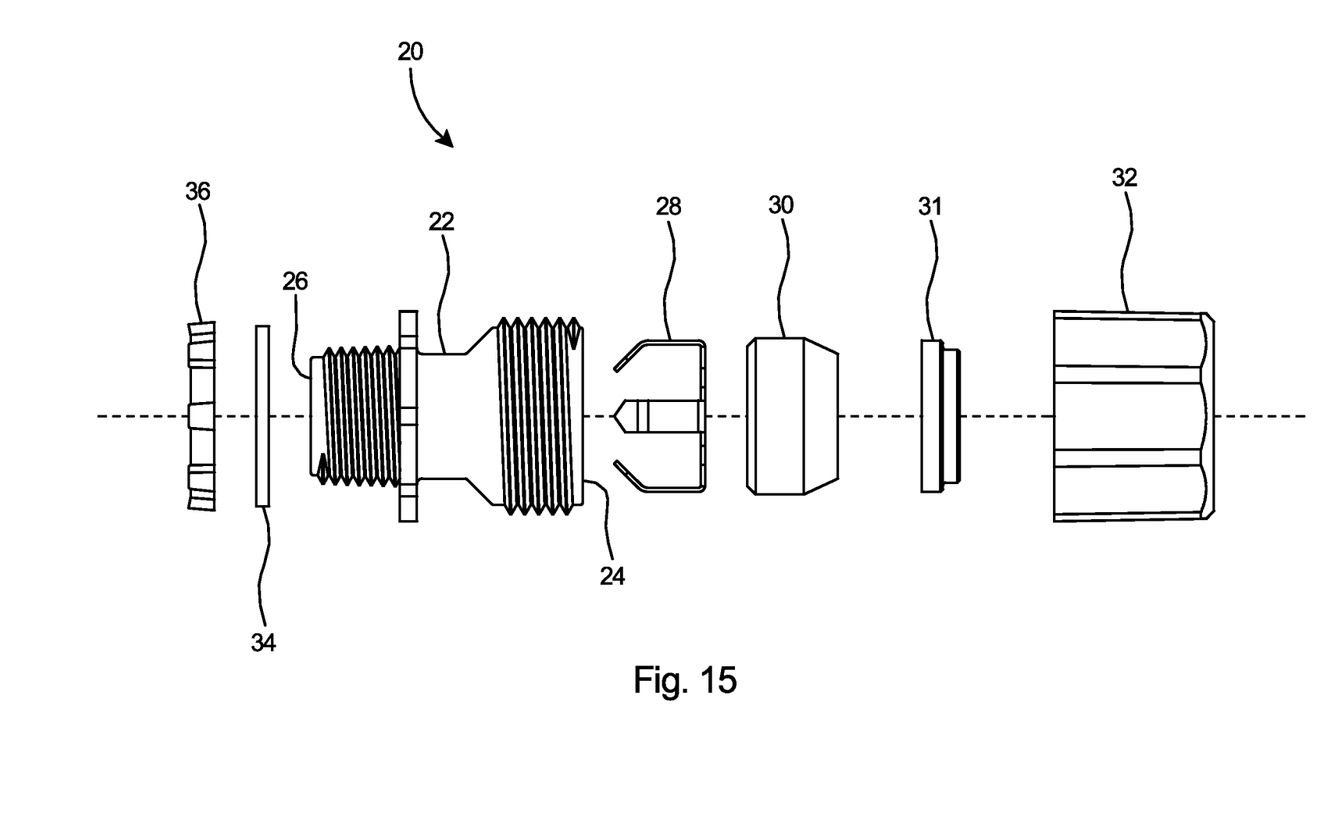
FIG. 15 is an exploded side view of the fitting for PVC-jacketed MC cable in accordance with embodiments of the invention.
Figure 16:
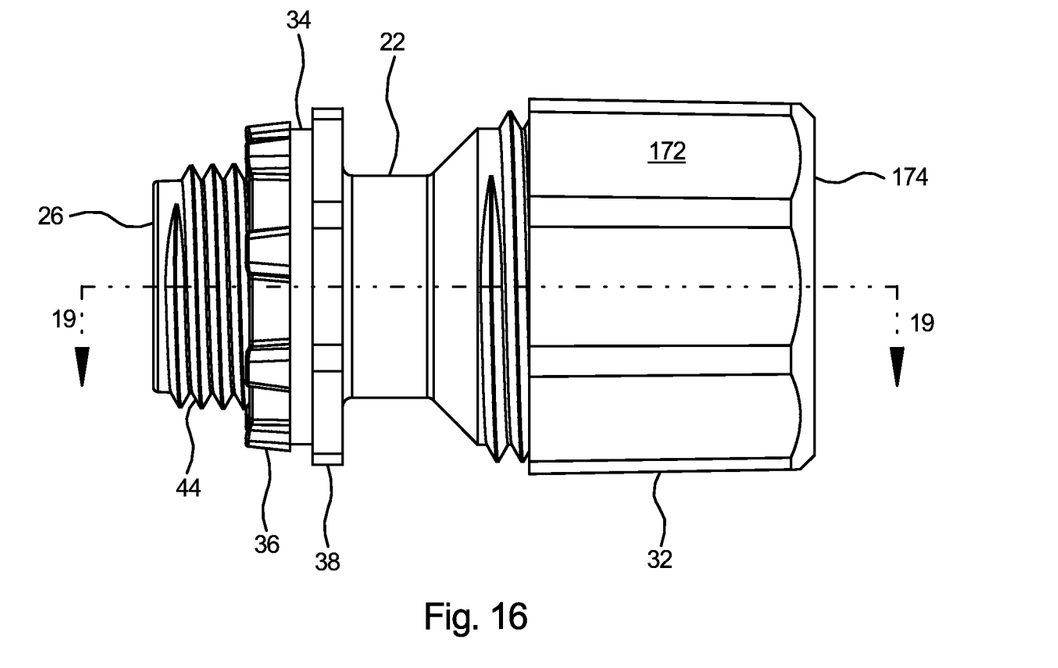
FIG. 16 is a side view of the assembled fitting.
Figure 17:
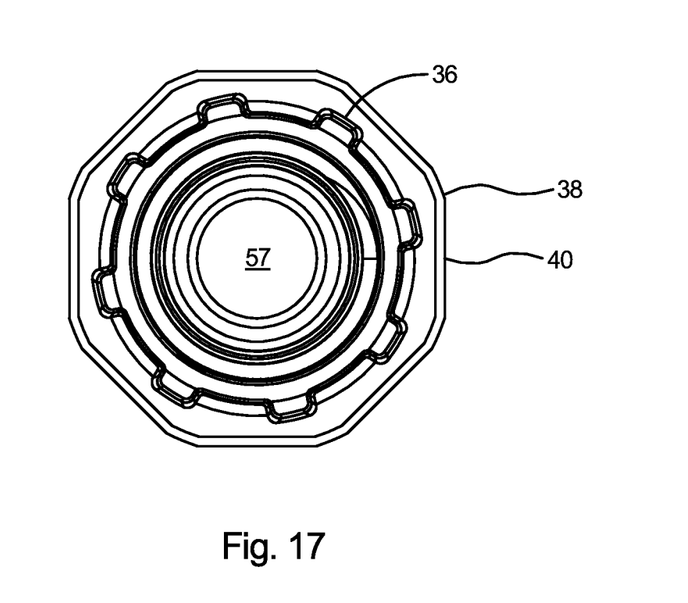
FIG. 17 is an end view of the fitting as viewed from the left side of FIG. 16.

With reference to FIGS. 13-14, the gland nut 32 includes an outer periphery 170 and a plurality of flat surfaces 172 for enabling gripping by a wrench or similar tool. The gland nut 32 further includes an inbound end 174 and an outbound end 176. The gland nut 32 includes a wide chamber 178 at the outbound end 176 and a through bore 180 at the inbound end 174. A chamfered surface 182 is provided around the inner periphery 184 at the outbound end of the nut. The interior surface of the nut at the outbound end 176 includes threads 186 thereon and a lip 188 with a flat engagement surface 190 thereon.

Referring to FIG. 19, for operation of the fitting 20 for PVC jacketed Metal Clad (PVC-MC) electrical cable, with the gland nut 32 partially threaded onto the fitting body 22, the electrical fitting 20 of the present invention is operated by inserting the outbound end 26 of the fitting body 22 through the knockout 200 of an electrical box 202. The sealing ring 34 is placed over the outbound end 26 and the locknut 36 tightened thereon to secure the outbound end 26 of the fitting 20 to the electrical box 202.

Central flange 38 of fitting body 22 limits the distance fitting 20 is inserted into the electrical box. The end portion of the PVC jacket is first stripped off the electrical cable. PVC-MC cable 204 is then inserted through bore 180 at the inbound end 174 of the gland nut 32. The PVC-MC cable 204 is inserted through fitting body 22 until fingers 127 of gripper ring 28 are engaged by the ramped surface 50 of fitting body. Gland nut 32 is then tightened upon threaded tubular portion 45 at the inbound end 24 of fitting body 22 and tightened until flat engagement surface 190 of gland nut 32 forces fingers 127 of gripper ring 28 inward into grooves 206 of PVC-MC cable 204 and compresses grommet 30 until it deforms or molds around and envelops the outer sheath of cable 204. The deformed grommet 30 creates a liquid-tight seal between the MC cable 204, the gripper ring 28, and the gland nut 32. The inward bent fingers 127 of gripper ring 28 lock and ground the armor layer 208 of the electrical cable 204 to the outbound end 26 of the fitting 20 and the compressed sealing ring 34 creates a liquid tight seal between the flange 38 of the fitting 20 and the electrical box 202. Conductors 210 from the electrical cable 204 pass easily through the outbound channel 54 and opening 57 at the outbound end 26 of the fitting body 22. Collar 150 of bushing 31 keeps the bushing centered within the fitting 20 while gland nut 32 is tightened. Engagement surface 160 of bushing 31 bears against the grommet 30 and compresses it as the gland nut 32 is tightened.

A critical feature of the electrical fitting 20 is the ability to create proper grounding of the PVC-MC cable 204 to the fitting body 22 and the fitting body to the electrical box 202 while the fitting at the same time creates a rain tight connection between the fitting 20 and the PVC-MC cable 204. The gripper ring 28 is preferably constructed of spring steel to impart resiliency to the ring 28 and the fingers 127 extending therefrom. The fitting body 22, locknut 36, and gland nut 32 are preferably constructed of an electrically conductive metal. Most preferably, the fitting body 22 is constructed of steel, stainless steel, zinc, or aluminum. The locknut 36 and gland nut 32 are preferably constructed of zinc alloy. Thus, when the fitting 20 is fully assembled as shown in FIG. 19, the fingers 127 of the gripper ring 28 securely grip the armor layer of the PVC-MC cable 204 while the gripper ring is securely seated against the fitting body 22. Furthermore, the locknut 36 is securely connected to the outbound end 26 of the fitting body 22 and the central flange 38 is securely held against the electrical box 202. Thus, a proper grounding path is established between the conductive armor layer of the PVC-MC cable 204, the electrical fitting 20, and the electrical box 202 thereby creating electrical continuity between the cable, the fitting, and the electrical box. The proper electrical continuity is established at the same time a rain tight connection is established between the electrical cable 204 and the fitting 20.

PVC-MC cable and Teck 90 cable are rated for installation outdoors and in concrete. Thus the electrical fitting 20 described herein is capable of forming liquid-tight and concrete-tight connections to accommodate electrical cables in these applications, such as in parking decks. The electrical fitting accommodates a range of cable sizes including three nominal sizes of PVC jacketed MC cable or Teck 90 cable, specifically #10, #12, and #14 cables.

Figure 21:
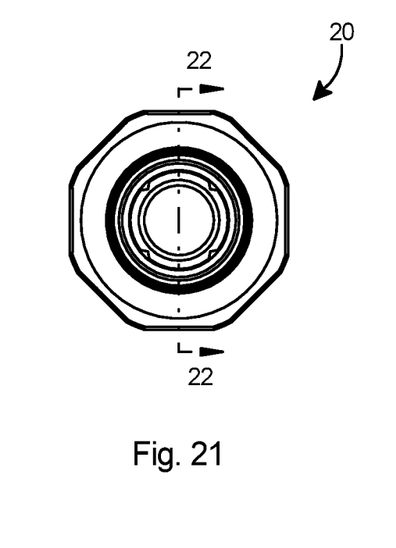
FIG. 21 is an end view of the assembled fitting for PVC-jacketed MC cable in accordance with embodiments of the invention.
Figure 22:
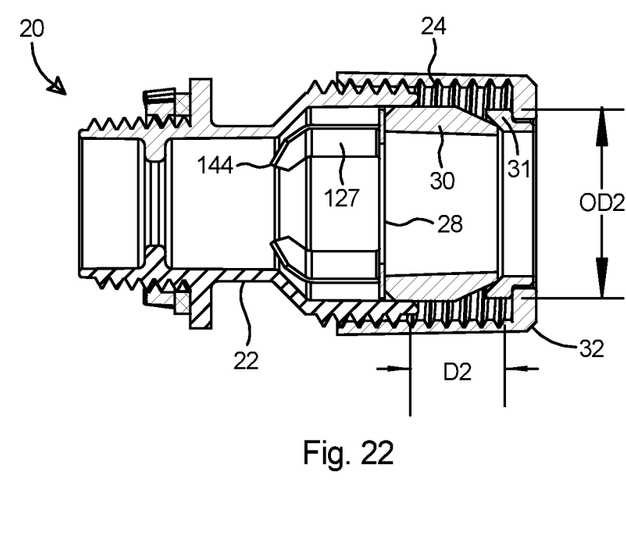
FIG. 22 is a sectional view of the fitting taken along line 22-22 of FIG. 21.

In comparison, as shown in FIGS. 21 and 22, the bushing 31 in the PVC-MC fitting 20 of the current invention is smaller in outside diameter OD2 than the inside diameter of the bore in the inbound end 24 of the connector body 22. As the gland nut 32 is tightened, bushing 31 is not limited in its travel distance D2 as it is not impeded or stopped by the connector body 22. Thus the bushing 31 is capable of compressing the grommet 30 much more than in prior art connectors, thereby enabling the fitting 20 to accommodate a wider range of cable sizes. This feature, in combination with the other features described herein, improve the functionality of the PVC-MC fitting in comparison to the prior art. Furthermore, as shown in FIG. 22, the fingers 127 of gripper ring 28 include sharpened points 144 that enable the arms to better find and enter the grooves 206 (see FIG. 19) of the armor layer of the electrical cable, thereby effecting a firmer grip on the electrical cable.

Figure 23:
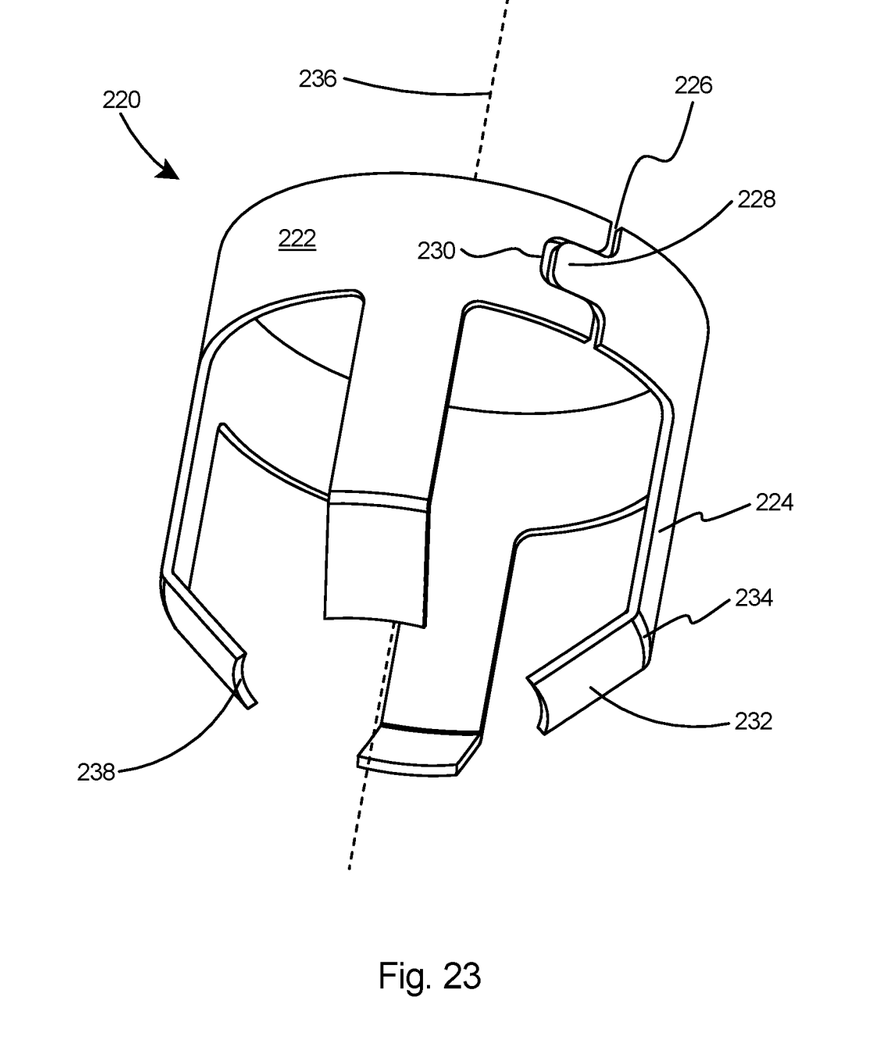
FIG. 23 is an isometric view of a gripper ring in accordance with embodiments of the invention.

Referring to FIG. 23, the second and preferred embodiment of the gripper ring 220 includes a cylindrical base 222 and one or more fingers 224 extending from the base. Gripper ring 220 is a split ring as shown by the gap 226 in the base. Preferably, a tongue 228 and groove 230 are provided at the gap 226 on portions of the base on opposite sides of the gap 226. Each finger 224 includes an end portion 232 that bends inward at a bend line 234 toward the central axis 236 of the gripper ring 220. Each finger 224 includes an arcuate end 238. The fingers 224 include a curvature to match the curvature of the cylindrical base 222.

Figures 24, 25, 26:
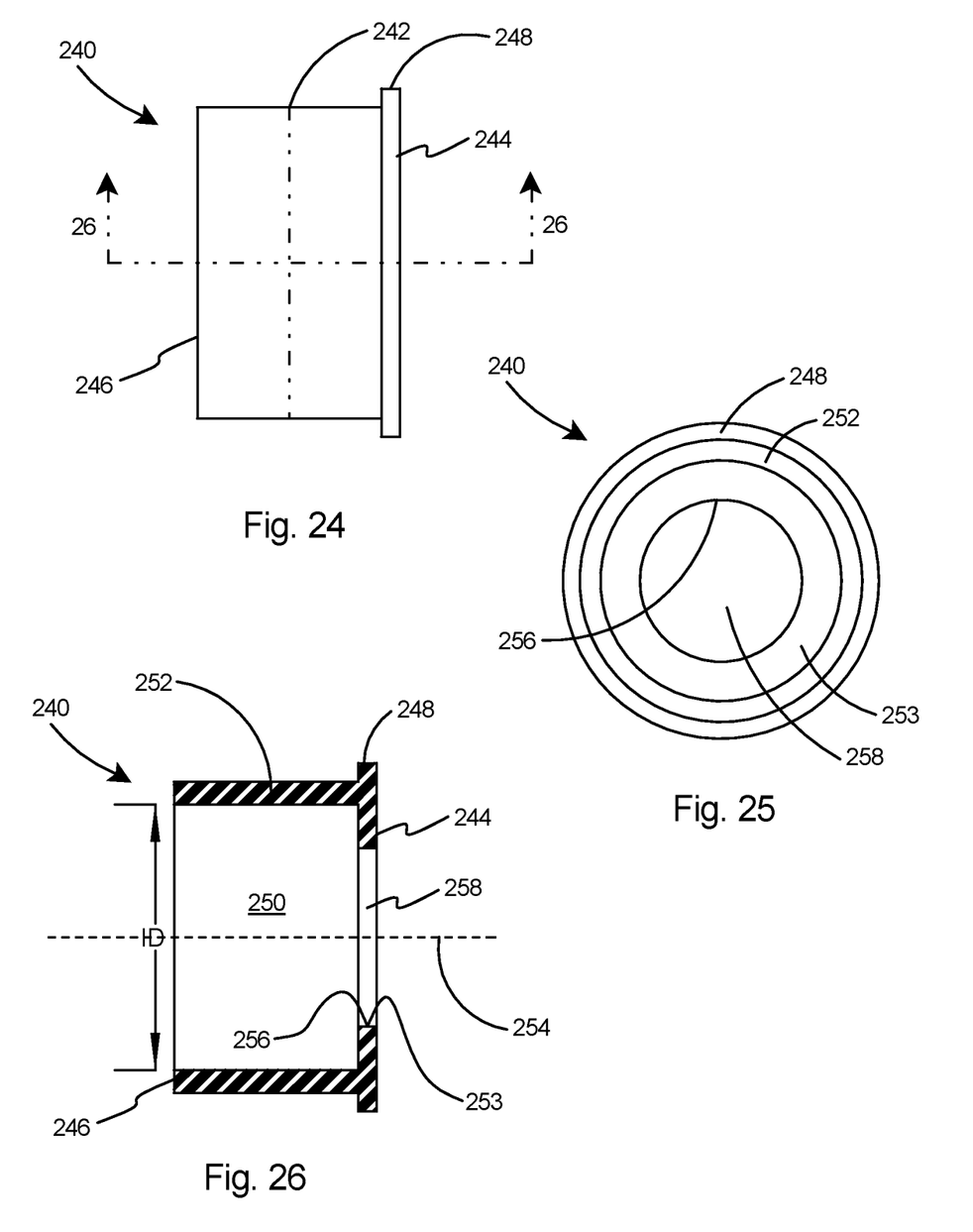
FIG. 24 is a side view of a grommet in accordance with embodiments of the invention.
FIG. 25 is an end view of the grommet.
FIG. 26 is a sectional view of the grommet taken along line 26-26 of FIG. 24.

With reference to FIGS. 24-26, an alternate and embodiment of the grommet 240 includes a tubular body 242 having an inbound end 244, an outbound end 246, and a flange 248 on the inbound end 244. A cavity 250 is formed within the outbound end 246 of the grommet 240 by a tubular wall 252 extending from the flange 248. Wall 252 is of constant inner diameter ID as shown in FIG. 26. Flange 248 includes a flexible inner lip 253 that extends inward toward the central axis 254 of the grommet body 242 and terminates in an inner periphery 256. Flange includes an opening 258 therein.

Figure 27:
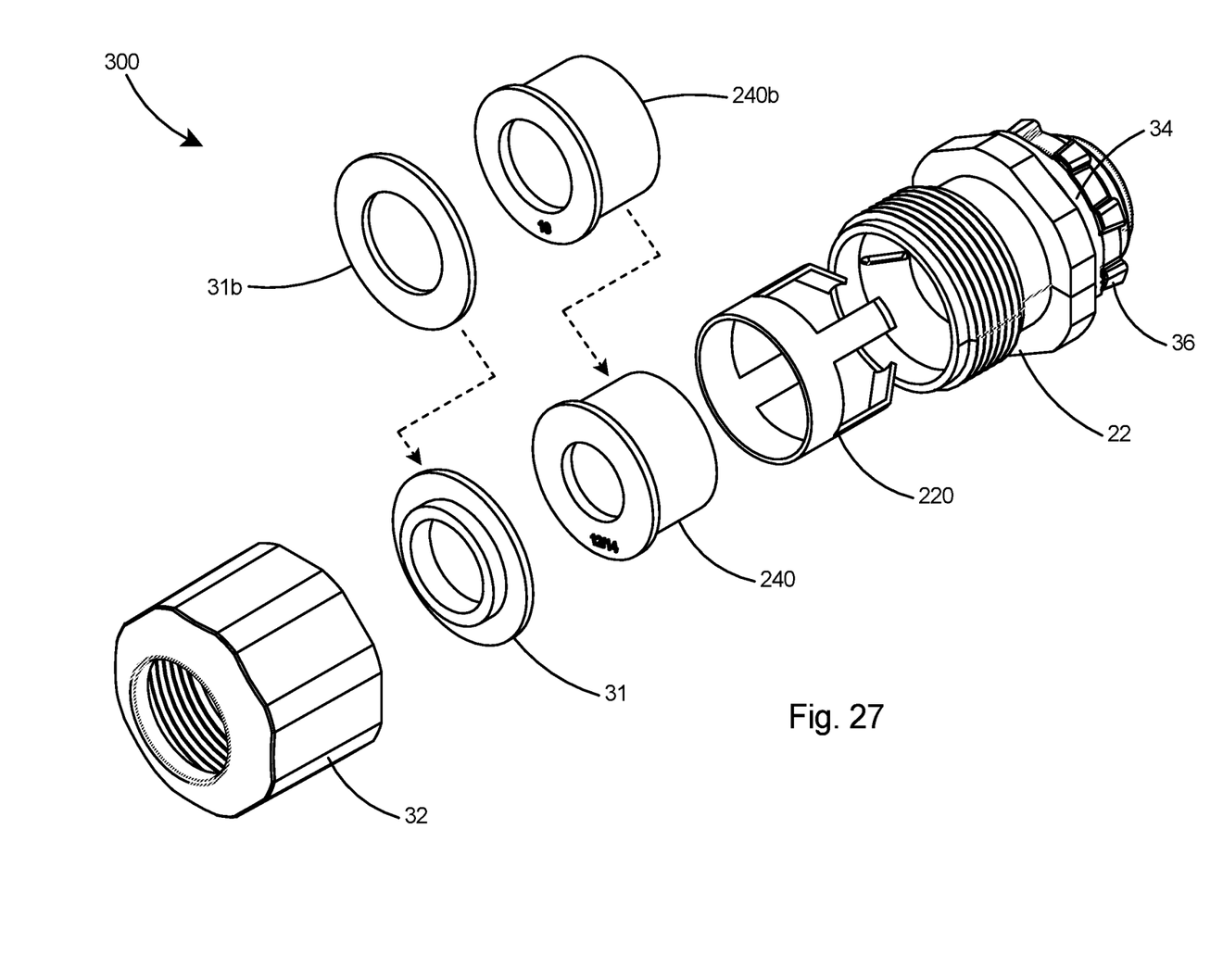
FIG. 27 is an exploded isometric view of an alternate and embodiment of the electrical fitting for accommodating a range of cable sizes according to the invention.

With reference to FIG. 27, an electrical fitting assembly 300 for accommodating a range of cable sizes includes a fitting body 22, a gripper ring 220, a first grommet 240, a first bushing 31, and a gland nut 32 for connecting #12, and #14 cables in a liquid-tight and concrete-tight connection to a junction box. Alternately, an installer at the job can substitute a second grommet 240b and a second bushing 31b for the first grommet and first bushing to connect #10 cables in a liquid-tight and concrete-tight connection to a junction box. The fitting assembly 300 of FIG. 27, by covering a range of cable sizes, thus reduces inventory and saves cost of stocking several different fittings.

Figure 28:
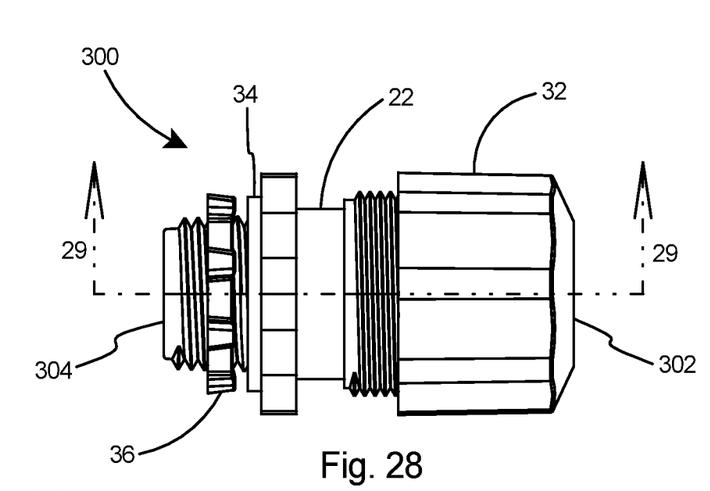
FIG. 28 is a side view of the fitting of FIG. 27 fully assembled.
Figure 29:
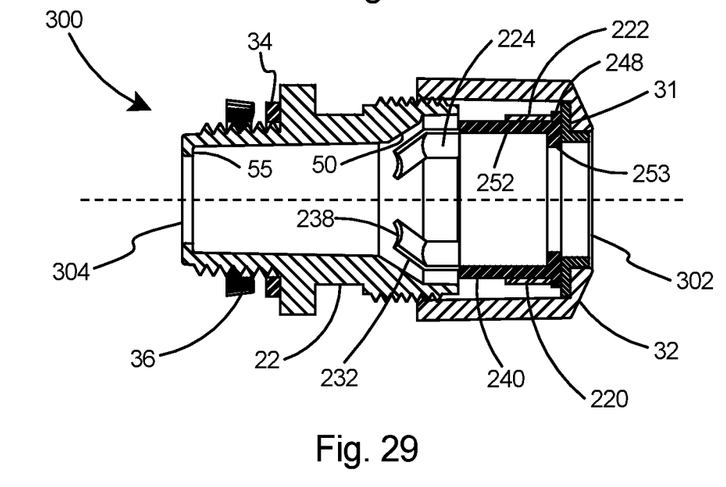
FIG. 29 is a sectional view of the fitting taken along line 29-29 of FIG. 28.

Referring to FIGS. 28 and 29, the assembled liquid-tight and concrete-tight fitting 300 includes an inbound end 302 for accepting insertion of a cable and an outbound end 304 for connection to a junction box. In the interior of the fitting 300, wall 252 of grommet 240 seats within cylindrical base 222 of gripper ring 220. Flange 248 of grommet 240 bears against the base 222 of the gripper ring 220. One side of bushing 31 seats against the flange 248 of grommet while the opposing side of the bushing 31 seats against the gland nut 32. Fingers 224 of gripper ring 220 extend toward the outbound end 304 of the fitting and end portions 232 angle toward the central axis of the fitting. In operation, outbound end 304 of fitting 300 is secured to a junction box (not shown) by tightening locknut 36 securely to the box until sealing ring 34 is compressed against the box. Initially, gland nut 32 is tightened loosely onto the inbound end 302 of the fitting 300. End portions 232 of fingers 224 are substantially parallel with the ramped surface 50 of the fitting body 22. An electrical cable (not shown), which has had the outer insulating sheath stripped away from the end, may then be inserted into the inbound end 302 of the fitting until the metal clad (MC) layer of the cable is stopped by cable stop 55 and the MC layer is engaged by the fingers 224 of the gripper ring 220. The arcuate ends 238 of the fingers 224 engage the metal clad (MC) layer of the cable. Tightening of the gland nut 32 then presses bushing 31 against flange 248 of grommet 240 which in turn presses gripper ring 220 further into the fitting. Full tightening of gland nut 32 presses fingers 224 of gripper ring 220 inward to bear tightly against the MC layer of the cable, thereby grounding the conductive MC layer of the cable to the fitting 300. Flexible lip 253 of grommet 240 seals against the cable to create a liquid-tight and concrete-tight seal.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A liquid-tight and concrete-tight electrical fitting, comprising:
   a tubular fitting body including an inbound end with an inbound bore, a flange, and an outbound end with an outbound bore;
   a tubular gripper ring in said inbound bore of said fitting body, said gripper ring including a base and a plurality of fingers extending from the base;
   a grommet disposed in said bore of said gripper ring;
   a gland nut for urging said grommet and said gripper ring within said inbound bore of said fitting body;
   said fingers of said gripper ring having end portions thereon;
   said end portions of said fingers projecting forward and radially inwardly from the fingers;
   said end portion of each finger of said gripper ring including a sharpened point;
   a cable stop extending from the interior of the fitting body into the outbound bore and dividing the body into a central channel and an outbound channel; and
   said cable stop between the flange and the outbound end of the fitting body.

* * * * *